United States Patent
Brodie et al.

(10) Patent No.: US 8,359,217 B2
(45) Date of Patent: Jan. 22, 2013

(54) METHOD AND APPARATUS FOR DETERMINING OPTIMIZED RESOLUTIONS FOR INFRASTRUCTURES

(75) Inventors: Mark Alan Brodie, Briarcliff, NY (US); Ashwin Lall, Rochester, NY (US); Anca Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 11/972,857

(22) Filed: Jan. 11, 2008

(65) Prior Publication Data

US 2009/0182591 A1    Jul. 16, 2009

(51) Int. Cl.
  *G06F 17/50* (2006.01)
(52) U.S. Cl. .............. 705/7.11; 705/7.12; 705/7.36
(58) Field of Classification Search .............. 705/1, 7, 705/1.1, 7.11, 7.12, 7.36
  See application file for complete search history.

(56) References Cited

U.S. PATENT DOCUMENTS

| | | | |
|---|---|---|---|
| 8,126,768 B2* | 2/2012 | Mehrotra et al. | 705/7.36 |
| 8,201,166 B2* | 6/2012 | Garrett et al. | 718/1 |
| 2002/0118207 A1 | 8/2002 | Jagla | |
| 2003/0224344 A1 | 12/2003 | Shamir et al. | |
| 2005/0038818 A1* | 2/2005 | Hooks | 707/104.1 |
| 2005/0091227 A1* | 4/2005 | McCollum et al. | 707/100 |
| 2005/0177628 A1* | 8/2005 | Victoria et al. | 709/220 |
| 2005/0190704 A1 | 9/2005 | Zhang et al. | |
| 2006/0111874 A1* | 5/2006 | Curtis et al. | 702/186 |
| 2006/0274062 A1 | 12/2006 | Zhang et al. | |
| 2008/0300834 A1 | 12/2008 | Wiemer et al. | |
| 2009/0168665 A1 | 7/2009 | Resende et al. | |
| 2009/0315890 A1 | 12/2009 | Modani | |
| 2010/0207947 A1 | 8/2010 | Sagalov | |

OTHER PUBLICATIONS

Ma et al., "Model-Based Dependency Management for Migrating Service Hosting Environment," IEEE International Conference on Services Computing (SCC 2007), Jul. 2007, pp. 356-363.*
C. Adam et al., "Implementation of a Service Middleware that Scales in System Size and Applications," 10th IFIP/IEEE International Symposium on Integrated Network Management (IM '07), May 2007, pp. 70-79.
M. Goldszmidt et al., "On the Quantification of e-Business Capacity," Proceedings of the 3rd ACM Conference on Electronic Commerce (EC '01), Oct. 2001, pp. 235-244.
E. Hubbert et al., "The Capacity Planning Software Market: Sustaining Application Performances," Forrester Research, Inc., Jun. 2007, pp. 1-4.
Y. Diao et al., "Stochastic Modeling of Lotus Notes with a Queueing Model," Computer Measurement Group International Conference (CMG 2001), Dec. 2001, pp. 229-238.

(Continued)

*Primary Examiner* — Sarah Monfeldt
(74) *Attorney, Agent, or Firm* — Anne V. Dougherty; Ryan, Mason & Lewis, LLP (57) ABSTRACT

An exemplary method of providing an optimized resolution to a problem in an infrastructure includes a step of determining at least one target configuration of the infrastructure wherein the target configuration is aligned with at least one template. The exemplary method also includes determining at least one resolution to the problem suitable for the at least one target configuration. The exemplary method also includes calculating at least one metric associated with at least one combination of at least one determined target configuration and at least one determined resolution. The exemplary method also includes selecting at least one combination of at least one determined transformation and at least one determined resolution based at least in part on the at least one calculated metric.

20 Claims, 4 Drawing Sheets

OTHER PUBLICATIONS

B. Callaway et al., "Enable XML Awareness in WebSphere Extended Deployment with WebSphere DataPower SOA Appliances," White Paper on IBM DeveloperWorks, Jul. 2006, 13 pages.

N. Bobroff et al., "Dynamic Placement of Virtual Machines for Managing SLA Violations," 10th IFIP/IEEE International Symposium on Integrated Network Management (IM '07), May 2007, pp. 119-128.

M. Badaloo, "An Examination of Server Consolidation: Trends that can Drive Efficiencies and Help Businesses Gain a Competitive Edge," White Paper on IBM Global Services, Dec. 2006, 16 pages.

S. Even, "Graph Algorithms," Computer Science Press, 1979, pp. 1-64, Chapters 1-6.

X. Liu et al., "Optimizing Overlay Topology by Reducing Cut Vertices," International Workshop on Network and Operating Systems Support for Digital Audio and Video (ACM NOSSDAV 2006), May 2006, pp. 99-104.

Q. Ma et al., "Model-Based Dependency Management for Migrating Service Hosting Environment," IEEE International Conference on Services Computing (SCC 2007), Jul. 2007, pp. 356-363.

K.T. Newport et al., "Design of Survivable Communications Networks under Performance Constraints," IEEE Transactions on Reliability, Oct. 1991, pp. 433-440, vol. 40, No. 4.

C.R. Rich, "TADDM's Flexible Approach to Discovery," IBM, Jul. 2007, pp. 1-17.

* cited by examiner

METHOD AND APPARATUS FOR DETERMINING OPTIMIZED RESOLUTIONS FOR INFRASTRUCTURES

CROSS-REFERENCE TO RELATED APPLICATIONS

The present application is related to commonly-assigned U.S. patent application Ser. No. 11/972,862, filed concurrently herewith, the disclosure of which is incorporated by reference herein.

FIELD OF THE INVENTION

The present invention relates generally to infrastructure maintenance, and more particularly relates to techniques for determining optimized resolutions for infrastructures.

BACKGROUND OF THE INVENTION

Organizations with complex IT (information technology) environments face the issue of what changes to make to their environment in order to enhance their services, for example by correcting failures that have occurred, maintaining or improving performance and availability, or expanding capacity to serve more users.

When they contact their maintenance support service to address this issue, the maintenance service faces the challenge of providing resolutions that both minimize the risk of unavailability by minimizing the number of changes needed in the customer's environment and maximize the benefit of applying the resolution by increasing automation, while remaining cost-effective for both the customer and the maintenance service provider.

Existing solutions that enable maintenance support to provide resolutions to the customer are primarily directed at specific resolution niches. These approaches do not provide a holistic maintenance service approach involving multiple resolution types for a given problem, nor do they optimize across different resolutions.

Accordingly, there exists a need for an improved technique of comparing different possible resolutions in terms of their cost, benefit and risk, for both the customer and maintenance support.

SUMMARY OF THE INVENTION

An exemplary method of providing an optimized resolution to a problem in an infrastructure includes a step of determining at least one target configuration of the infrastructure wherein the target configuration is aligned with at least one template. The exemplary method also includes determining at least one resolution to the problem suitable for the at least one target configuration. The exemplary method also includes calculating at least one metric associated with at least one combination of at least one determined target configuration and at least one determined resolution. The exemplary method also includes selecting at least one combination of at least one determined transformation and at least one determined resolution based at least in part on the at least one calculated metric.

Techniques according to embodiments of the present invention advantageously provide for examination of failure notifications (both proactive and reactive), resolution rules, dependency constraints between IT subsystems, IT product costs, and best practices IT infrastructure templates to optimize for the customer the cost-benefit ratio of the resolutions suggested by the maintenance provider and minimize the service cost for the maintenance provider.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described herein in the context of illustrative methodologies for determining optimized resolutions in maintenance services. It should be understood, however, that although the present invention is described herein primarily as applied to information technology infrastructures, inventive techniques may be applicable to determining optimized resolutions within any number of fields.

Figure 1:
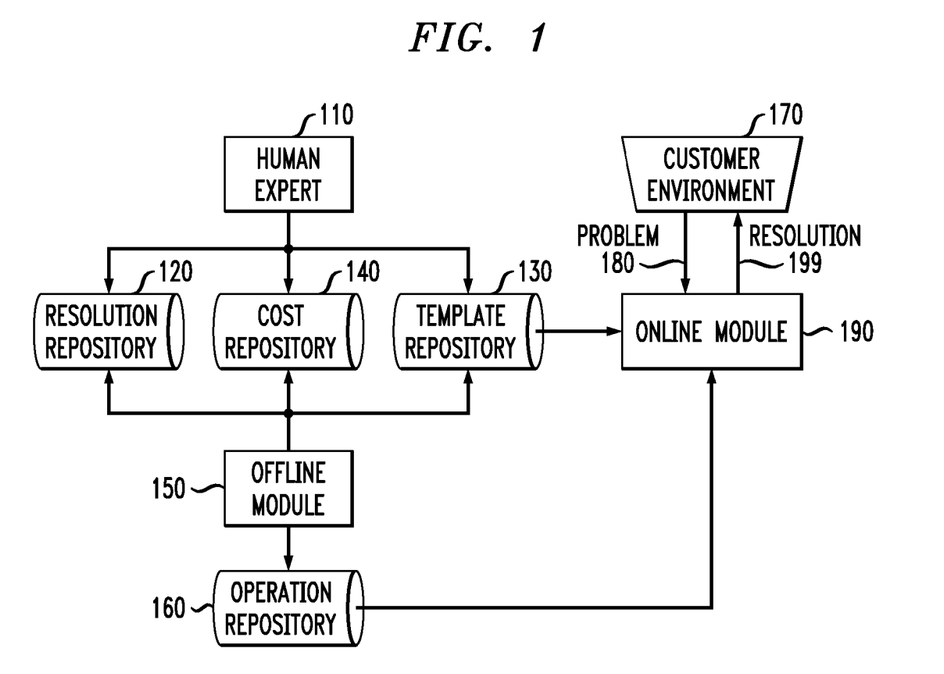
FIG. 1 is a diagram showing an exemplary method for providing optimized resolutions in maintenance services according to an illustrative embodiment of the present invention.

FIG. 1 shows an exemplary system for providing optimized resolutions in maintenance services according to an illustrative embodiment of the present invention.

In a preferred embodiment, the data stored in repositories 120, 130, 140 and 160 are collected prior to the need to provide an optimized resolution. This collection, to be described in further detail below with reference to step 210 in FIG. 2, may include manual entry by a human expert 110 or an automated process performed by, for example, offline component 150 and/or a software tool such as, for example, Tivoli Application Dependency Discovery Manager (TADDM), commercially available from International Business Machines Corporation, Armonk, N.Y. Each of repositories 120, 130, 140 and 160 may be implemented using one or more databases, collections of files, or file resources, or any portion thereof. Moreover, these repositories may be implemented in, for example, a local, remote, centralized or distributed manner.

Rule repository 120 stores action rules that correlate problems with remediation actions. Examples of such action rules may include "if a system runs out of disk space, an administrator could take one of the following actions: add another hard drive, or replace with a larger hard drive, or add a storage area network"; "if CPU reaches 80%, add more CPU, or add a new machine, or migrate the application to another server". Those skilled in the art will appreciate, however, that these are exemplary rules only, and that any problem resolution rule may be used without departing from the spirit of the present invention.

Template repository 130 stores one or more templates which include constraints and/or dependencies that reflect the best practices configuration templates supported by a specific maintenance service provider. These templates will be discussed in greater detail hereinafter with reference to FIG. 3.

Cost repository 140 stores costs related to the products involved in the best practices configurations stored in template repository 130. Such costs may include, for example, product cost, installation cost, cost of the necessary configuration to work with required products, cost of generated downtime, etc.

Offline module 150 is operative to automate the operations necessary to apply the resolution actions stored in rule repository 120 to the templates stored in template repository 140. The operation of offline module 150 will be discussed in greater detail hereinafter with reference to FIG. 2. Module 150 may be implemented using hardware, software, or any combination thereof. Module 150 may be implemented as one or more modules executed using one or more processors, or it may represent any portion of a module.

Operation repository 160 stores any workflows, scripts or programs that describe or automate the operations necessary to execute the actions associated with the rules stored rule repository 120 on the infrastructure templates stored in template repository 140. Examples of such operations may include, for example, software products installations, configuration, upgrades, migrations and troubleshooting, updates deployment, hardware part replacement or extension.

Customer environment 170 may be any system infrastructure for which optimized resolutions in maintenance services are desired. For example, customer environment 170 may comprise a multi-tier e-commerce system including, for example, web based presentation systems, access systems, application business logic, messaging systems, database systems and storage subsystems, running under operating systems and specific hardware and connected by local and wide area networks.

Problem 180 may represent an actual problem (e.g., a degradation of user transaction performance) or a potential problem (e.g., CPU utilization of a server approaching a limit) identified in customer environment 170. This problem may be identified via a call or electronic notification from the customer's site or via a proactive monitoring by a maintenance service provider. Along with the problem itself, online module 190 preferably either discovers or is provided with the current characteristics of the customer environment 170, including for example, the physical, logical and business topology, as well as the performance and resource utilization of customer environment 170.

Online module 190 is operative to generate the optimal resolution 199 for problem 180 in customer environment 170. The operation of online module 190 will be discussed in greater detail hereinafter with reference to FIG. 2. Module 190 may be implemented using hardware, software, or any combination thereof. Module 190 may be implemented as one or more modules executed using one or more processors, or it may represent any portion of a module.

Figure 2:
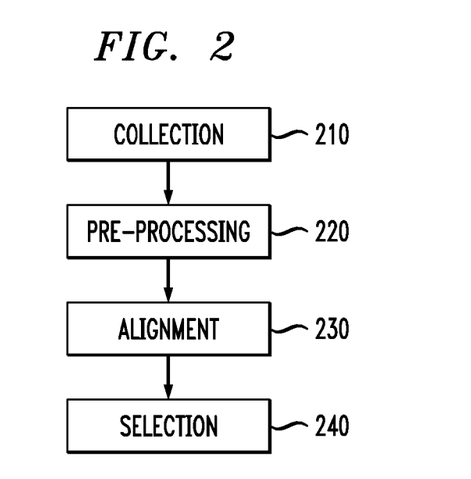
FIG. 2 is a diagram showing an exemplary system for providing optimized resolutions in maintenance services according to an illustrative embodiment of the present invention.

FIG. 2 is a simplified diagram showing an exemplary method according to an illustrative embodiment of the present invention. This exemplary method comprises two offline steps (collection 210 and pre-processing 220) and two online steps (alignment 230 and selection 240). In a preferred embodiment, offline steps 210 and 220 are performed prior to online steps 230 and 240 in order to collect and pre-process data for later use in the on-line steps, thereby reducing the run time labor cost of the maintenance service and the time to repair the problem. Likewise, in this preferred embodiment, online steps 230 and 240 are performed after a problem reported by a customer (or, proactively, a potential failure) has been identified and the root cause determined. With reference to FIG. 1, offline steps 210 and 220 are preferably performed by offline module 150 and online steps 230 and 240 are preferably performed by online module 190.

The method begins with collection step 210, in which various data is gathered and, preferably, stored for later use. The data gathered during the collection step may include, for example: (i) remedies recommended to solve known problems (which may be obtained from, for example, manuals, web sites, or forums) (e.g., rules stored in rules repository 120 in FIG. 1), (ii) IT constraints and dependencies known to exist between products supported by the maintenance service provider; and (iii) costs of the products supported by the maintenance service provider (these costs, which include direct costs like product cost, operations cost, administration cost and change cost, and indirect costs like downtime cost, are typically available for TCO calculation) (e.g., costs stored in costs repository 140 in FIG. 1).

Collection step 210 may further comprise building at least one configuration template describing one or more specific aggregations of best practices configurations recommended by the maintenance service provider (e.g., templates stored in template repository 130 in FIG. 1). A maintenance provider may use different templates, individualized per industry or per customer type. These templates will be discussed in greater detail below with reference to FIG. 3.

Pre-processing step 220 includes the standardization and automation of common operations such as software products installation, configuration, upgrade, migration and troubleshooting, particularly for simple problem resolutions. Advantageously, the use of a template rather than customized solutions reduces the number of operations used in problem resolutions sufficiently to permit cost-effective automation of these tasks, which in turn facilitates evaluation of the benefits associated with these tasks.

Alignment step 230 comprises determining at least one target configuration of the infrastructure aligned with at least one template. This step may include, for example, replacing non-supported elements found in the current infrastructure with equivalent supported elements so as to render the infrastructure consistent with a template. Preferably, this alignment should use the minimum number of changes and take into account any special customer restrictions. This alignment advantageously helps to match the customer's cost expectations and minimize the maintenance provider service cost.

This optimized migration is the major challenge for the maintenance service provider because of the multiple potential customer restrictions, e g , minimum costs of changes, minimum or no changes of the products directly related to their applications, software restrictions, etc. Moreover, this optimization facilitates the use of the automated remediation operations built off-line for the template. Because most IT infrastructures rely on redundancy at one or more of the stack layers, e.g., application, middleware, hardware, the technique may consider only the base pattern of the IT infrastructure, with unique products, rather than the whole IT environment with duplicates. The results of the alignment are applied seamlessly to all the infrastructure products, regardless of duplication. A preferred technique for aligning of the base pattern of the IT infrastructure to the maintenance provider template and the generation of the optimized target customer infrastructure is discussed in related application Ser. No. 11/972,862. Other alignment techniques may be used in conjunction with embodiments of the present invention.

Selection step 240 comprises determining at least one resolution to the problem suitable for the at least one target configuration determined in alignment step 230; calculating a metric for at least one combination of determined target configuration and determined resolution; and selecting at least one combination of at least one determined target configuration and at least one determined resolution based at least in part on the at least one calculated metric.

This metric may comprise, for example, a total cost including a migration cost associated with implementing the target configuration and a cost associated with the determined resolution. These two partial costs may be computed using data stored in, for example, cost repository 140 in FIG. 1. Moreover, since the resolution operations have preferably been preprocessed offline and stored in operation repository 160 in FIG. 1, it is expected that most of the cost will be due to the migration. Metrics may also include, for example, migration cost, cost vs. benefit, a number of changes, or a number of changes of products directly related to the customer applications, or any other metric that the customer or the maintenance provider considers relevant.

Advantageously, for each resolution option the recommended resolution is optimized with respect to the cost and benefit of the resolution; also the customer can compare and choose between a range of resolution options based on their cost and benefit. One advantage associated with an embodiment of the present invention may include reducing a maintenance cost by first aligning the customer's IT infrastructure to one of a limited number of best practices templates and then applying the chosen resolution using a standardized, automated, and inexpensive process.

Figure 3:
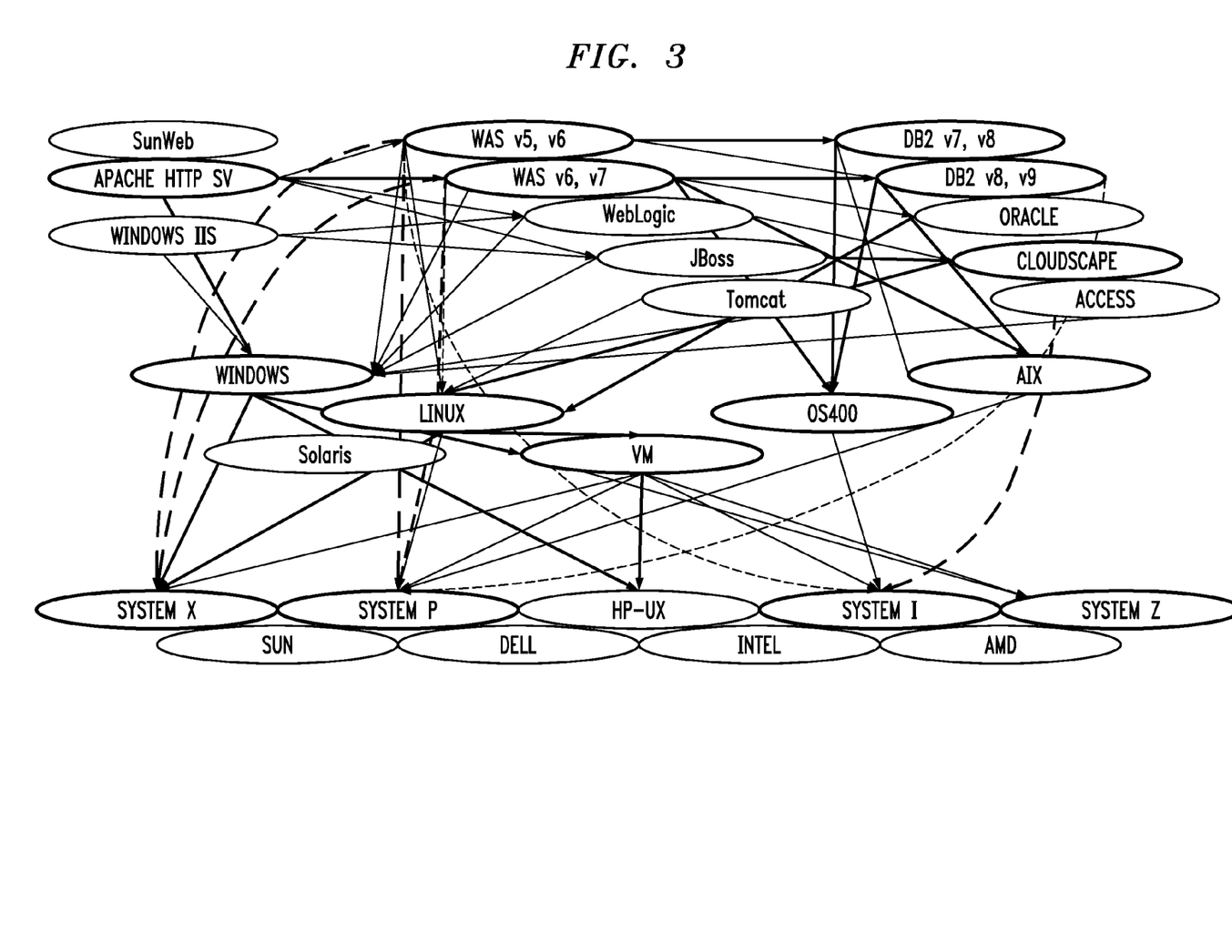
FIG. 3 shows an exemplary template suitable for use with an illustrative embodiment of the present invention.

FIG. 3 illustrates an exemplary configuration template suitable for use with an illustrative embodiment of the present invention. It should be noted that techniques of the present invention do not require the use of any given configuration template; rather, configuration templates in a variety of formats and/or containing differing quantities and types of information may also be used with the present invention.

The bold nodes in FIG. 3 identify the supported products, e.g., those which should be contained within the target infrastructure. Examples of such products and their dependencies are: "Web application server M version a.b.c works with database server N version x.y.z"; "Web application server M version a.b.c works on Linux Suze version n.m." The solid arrows in FIG. 3 indicate such configuration dependencies. Lack of an arrow indicates either an unfeasible configuration or a constraint on a potential dependency that is unsupported.

Configuration conflicts are another potential type of constraint. Examples of software conflict constraints are: "Windows Defender has issues on Windows Vista," "Websphere AS v5 on AIX conflicts with Oracle Web Services Manager."

Classes of equivalence indicate which products provide similar functionality. Examples of classes of equivalence are: "Web application servers are: WebLogic, JBoss, JRun, Tomcat," "Database servers are: DB2, Access, dBase, MySQL, Oracle, SyBase." In FIG. 3, the nodes clustered together belong to the same class of equivalence.

Dependencies like amount of RAM, hard drive or CPU required by particular products, which need to be summed up on each machine, are indicated by the dashed arrows in FIG. 3. Note that not all valid dependencies and other constraints are shown in FIG. 3 for visibility reasons.

Figure 4A:
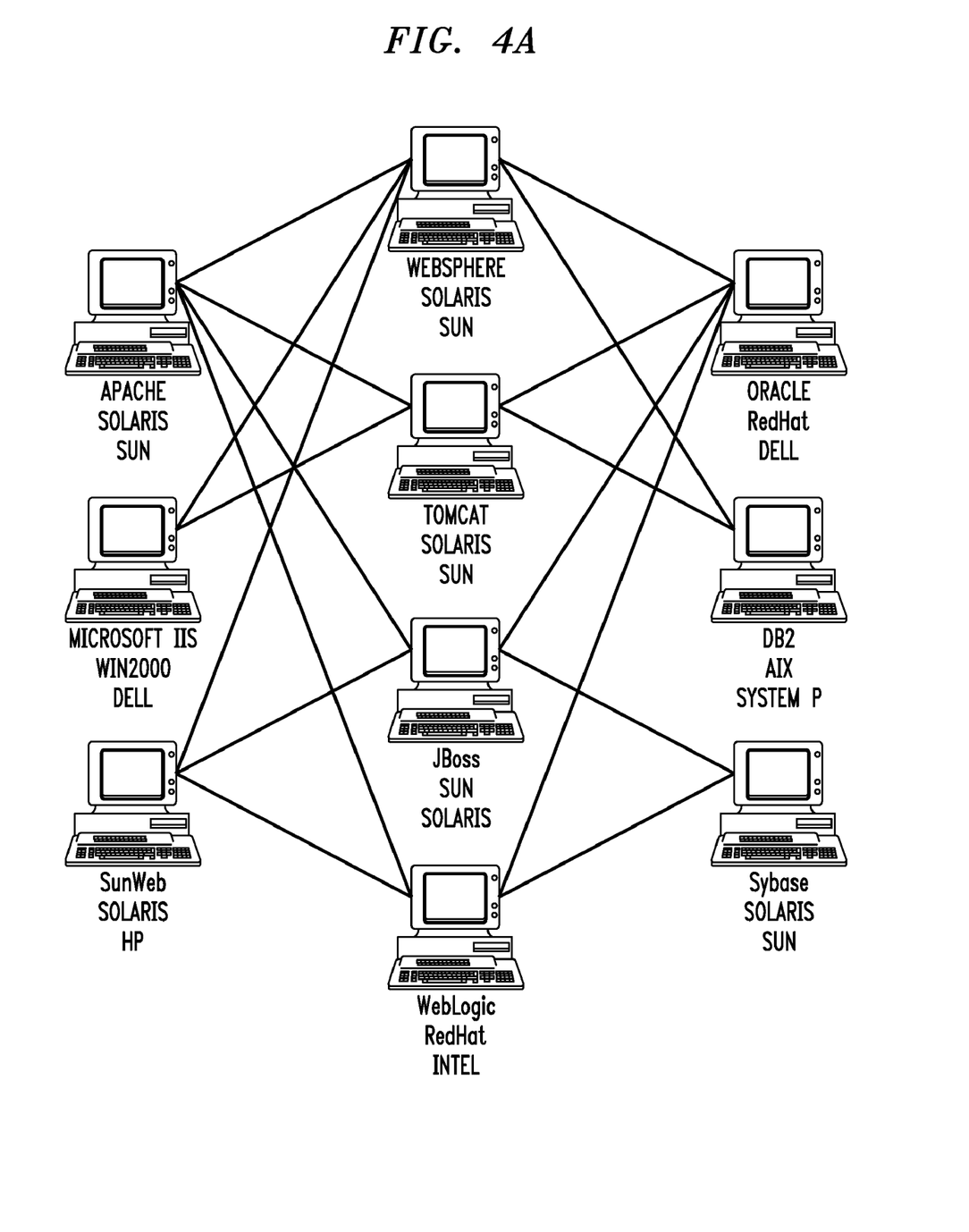
FIG. 4A represents a possible configuration of an infrastructure which is incompatible with the template shown in FIG. 3.

FIG. 4A represents a possible configuration of an infrastructure which is incompatible with the template shown in FIG. 3.

Figure 4B:
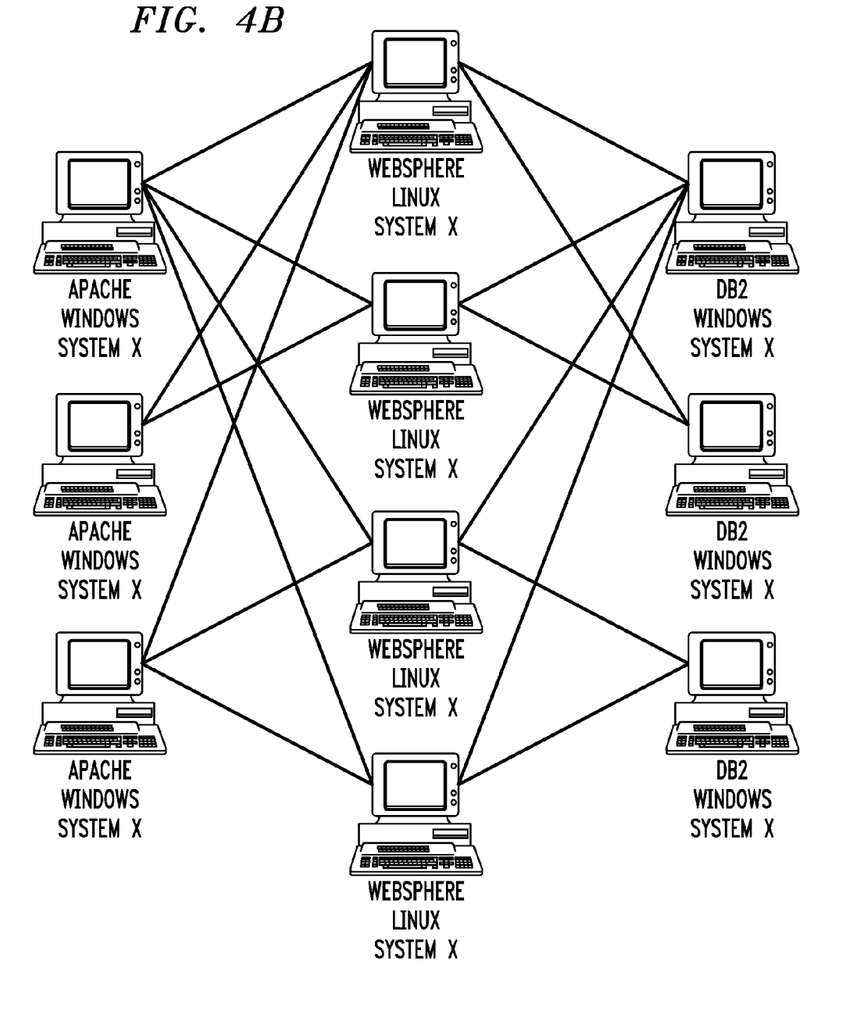
FIG. 4B represents a possible target configuration of the infrastructure shown in FIG. 4A after an alignment according to an illustrative embodiment of the present invention.

FIG. 4B represents a possible target configuration of the infrastructure shown in FIG. 4A after an alignment according to an illustrative embodiment of the present invention. Specifically, non-supported elements found in the current infrastructure have been replaced with equivalent supported elements so as to render the infrastructure consistent with the template shown in FIG. 3.

Figure 5:
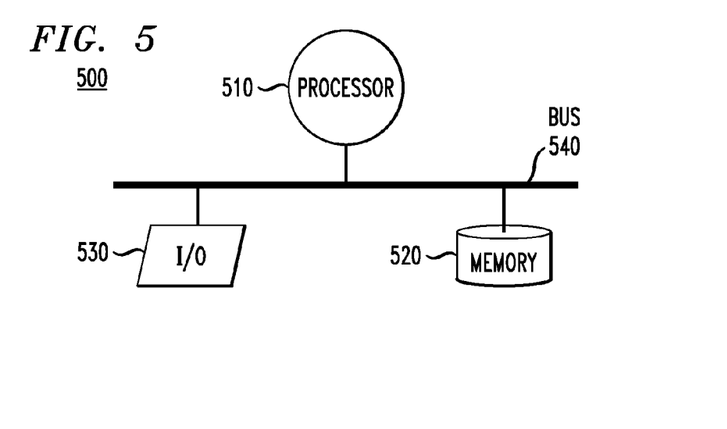
FIG. 5 is a block diagram depicting an exemplary processing system in which inventive techniques may be implemented.

The methodologies of embodiments of the invention may be particularly well-suited for use in an electronic device or alternative system. For example, FIG. 5 is a block diagram depicting an exemplary processing system 500 formed in accordance with an aspect of the invention. System 500 may include a processor 510, memory 520 coupled to the processor (e.g., via a bus 540 or alternative connection means), as well as input/output (I/O) circuitry 530 operative to interface with the processor. The processor 510 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 510. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A processor-implemented method of responding to detection of a problem in an information technology (IT) infrastructure, the method comprising the steps of:
   determining by a processor one or more target configurations of the IT infrastructure such that migrating a current configuration of the IT infrastructure to the one or more target configurations will align the IT infrastructure with one or more configuration templates;
      determining by the processor one or more remediation actions, wherein a given remediation action is applicable to the IT infrastructure configuration when migrated from the current configuration to at least one of the one or more target configurations;
      determining by the processor one or more resolutions of the problem, wherein a given resolution of the problem comprises:
      migrating the current configuration of the IT infrastructure to a given one of the one or more target configurations, thereby aligning the IT infrastructure with at least one of the one or more configuration templates; and
      applying at least one of the one or more remediation actions to the IT infrastructure once the current configuration of the IT infrastructure is migrated to the given one of the one or more target configurations;
   calculating by the processor at least one metric associated with the given resolution of the problem; and
   selecting by the processor the given resolution of the problem based at least in part on the at least one calculated metric;
   wherein the steps are performed responsive to the detection of the problem in the IT infrastructure.

2. The method of claim 1, wherein at least a given one of the one or more configuration templates specifies at least one configuration constraint.

3. The method of claim 2, wherein the at least one configuration constraint comprises at least one of a configuration dependency and a configuration conflict.

4. The method of claim 1, wherein at least a given one of the one or more configuration templates specifies one or more equivalent products.

5. The method of claim 1, wherein at least a given one of the one or more configuration templates is selected from a repository of configuration templates stored prior to the detection of the problem.

6. The method of claim 1, wherein at least a given one of the one or more remediation actions is selected from a repository of remediation actions stored prior to the detection of the problem.

7. The method of claim 1, further comprising a step of implementing the at least one of the given resolutions of the problem using at least one automated operation selected from a repository of automated operations stored prior to the detection of the problem.

8. The method of claim 1, wherein the at least one calculated metric comprises at least one of a cost, a benefit, and a number of product changes.

9. The method of claim 1, wherein determining at least one target configuration comprises replacing at least a first product in the current configuration of the IT infrastructure with at least a second product when at least a given configuration template indicates that the at least first product is equivalent to the at least second product.

10. The method of claim 1, wherein determining at least one target configuration comprises considering only unique IT infrastructure products within the current configuration of the IT infrastructure while ignoring duplicate IT infrastructure products within the current configuration of the IT infrastructure.

11. An apparatus for responding to detection of a problem in an information technology (IT) infrastructure, the apparatus comprising:
   a memory; and
   a processor coupled to the memory and operative to perform the operations of:
      determining one or more target configurations of the IT infrastructure such that migrating a current configuration of the IT infrastructure to the one or more target configurations will align the IT infrastructure with one or more configuration templates;
         determining one or more remediation actions, wherein a given remediation action is application to the IT infrastructure when migrated from the current configuration to at least one of the one or more target configurations;
         determining one or more resolutions of the problem, wherein a given resolution of the problem comprises migrating the current configuration of the IT infrastructure to a given one of the one or more target configurations, thereby aligning the IT infrastructure with at least one of the one or more configuration templates, and applying at least one of the one or more remediation actions to the IT infrastructure once the current configuration of the IT infrastructure is migrated to the given one of the one or more target configurations;
      calculating at least one metric associated with the given resolution of the problem; and
      selecting the given resolution of the problem based at least in part on the at least one calculated metric;
      wherein the operations are performed responsive to the detection of the problem in the IT infrastructure.

12. The apparatus of claim 11, wherein at least a given one of the one or more configuration templates specifies at least one configuration constraint.

13. The apparatus of claim 11, wherein determining at least one target configuration comprises replacing at least a first product in the current configuration of the IT infrastructure with at least a second product when at least a given configuration template indicates that the at least first product is equivalent to the at least second product.

14. An article of manufacture for responding to detection of a problem in an information technology (IT) infrastructure, the article comprising a non-transitory computer-readable storage medium encoded with one or more software programs that, when executed by a processor, perform the steps of:
   determining one or more target configurations of the IT infrastructure such that migrating a current configuration of the IT infrastructure to the one or more target configurations will align the IT infrastructure with one or more configuration templates;
   determining one or more remediation actions, wherein a given remediation action is applicable to the IT infrastructure configuration when migrated from the current configuration to at least one of the one or more target configurations;
   determining one or more resolutions of the problem, wherein a given resolution of the problem comprises migrating the current configuration of the IT infrastructure to a given one of the one or more target configurations, thereby aligning the IT infrastructure with at least one of the one or more configuration templates, and applying at least one of the one or more remediation actions to the IT infrastructure once the current configuration of the IT infrastructure is migrated to the given one of the one or more target configurations;

calculating at least one metric associated with the given resolution of the problem; and selecting the given resolution of the problem based at least in part on the at least one calculated metric.

15. The article of claim 14, wherein at least a given one of the one or more configuration templates specifies at least one configuration constraint.

16. The article of claim 14, wherein determining at least one target configuration comprises replacing at least a first product in the current configuration of the IT infrastructure with at least a second product when at least a given configuration template indicates that the at least first product is equivalent to the at least second product.

17. The method of claim 1, wherein determining at least a given target configuration comprises replacing at least a first product in the current configuration of the IT infrastructure with at least a second product when at least a given configuration template indicates that the at least first product is unsupported and that the at least second product is supported.

18. The method of claim 1, wherein a given metric associated with the given resolution of the problem is calculated based on:

a first metric associated with migrating the current configuration of the IT infrastructure to the given one of the one or more target configurations; and a second metric associated with applying the at least one of the one or more remediation actions to the IT infrastructure once the current configuration of the IT infrastructure is migrated to the given one of the one or more target configurations.

19. The method of claim 18, wherein at least one of the first metric and the second metric is computed based at least in part on data stored in a repository prior to the detection of the problem.

20. The method of claim 18, wherein the given metric comprises a total cost associated with the given resolution of the problem, and wherein the first metric and the second metric comprise respective first and second partial costs associated with the given resolution of the problem.

* * * * *